Oct. 24, 1933.  H. D. JAMES  1,932,073
SPEED CONTROL FOR ELEVATORS
Filed Nov. 26, 1930
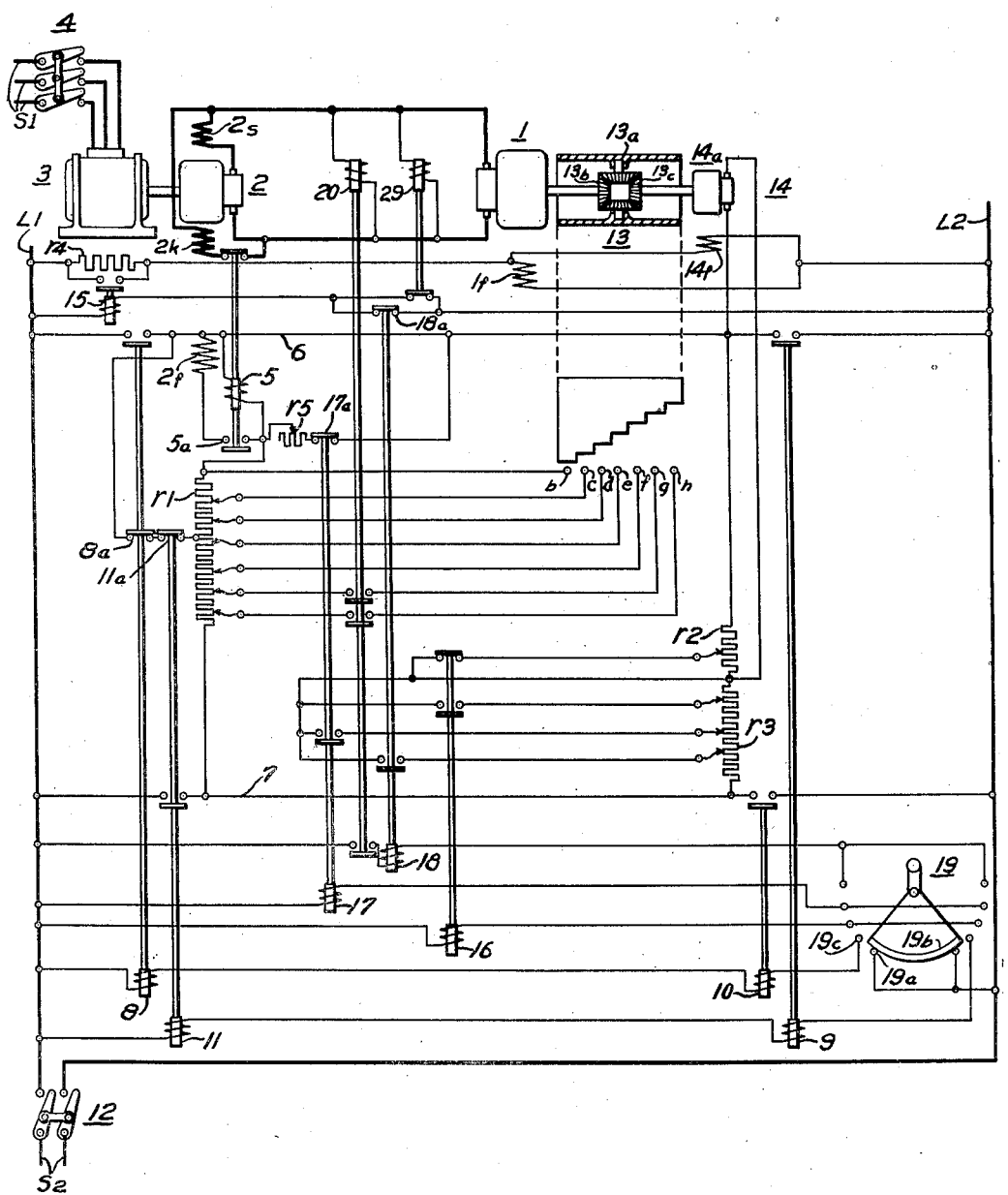
WITNESSES.
INVENTOR
Henry D. James
BY
ATTORNEY Patented Oct. 24, 1933

1,932,073

UNITED STATES PATENT OFFICE 1,932,073

SPEED CONTROL FOR ELEVATORS

Henry D. James, Edgewood, Pa., assignor to Westinghouse Electric & Manufacturing Company, a corporation of Pennsylvania Application November 26, 1930
Serial No. 498,423

7 Claims. (Cl. 172—239)

My invention relates to motor-control systems and has particular relation to motor-control systems of the variable-voltage type. While not limited thereto, my invention is particularly applicable to variable-voltage-control systems in which accurate motor-speed regulation must be maintained over a considerable range of loads and speeds, such as drives for high-speed elevators and similar apparatus.

In the variable-voltage system, the speed and direction of rotation of the motor are controlled by varying and reversing a voltage applied to the motor armature, by means of a variable-voltage generator, while the motor excitation is held constant. After the maximum voltage of the generator has been reached, the speed of the motor is, in some systems, further increased by reducing the excitation of the motor. In control systems of either type, the motor may be operated at any speed within a wide range and may be retarded by regenerative braking over all increments of the speed range. A particular advantage of this type of control is that the motor-speed regulation is substantially independent of all variables except the armature current; the motor speed falling with motoring loads and rising with regenerative loads, a uniform amount depending upon the armature current, at all settings of the generator-field rheostat.

Because of the latter characteristic, substantially flat motor-speed regulation at all speeds may be obtained by cumulatively compounding the generator a proper amount to compensate for the resistance drops in the generator and motor armatures. For this purpose, the generator is ordinarily provided with a cumulative series winding or other equivalent compounding means, if a high degree of accuracy of motor-speed regulation is required. However, the latter arrangement has the disadvantage that the degree of generator compounding, necessary to maintain flat motor speed regulation, is such that the critical load resistance for the generator, considered as a series machine, is approximately equal to the resistance of the motor armature. Because of unequal heating and cooling of the motor and generator armatures, during operation and variations of brush resistance, the motor armature reactance may, at times, become less than the critical resistance for the generator, causing the armature circuit to become unstable. As the speed of the generator armature and the fly-wheel effect of the motor armature are ordinarily high, energy oscillations of considerable magnitude may take place because of the unstable condition of the armature circuit, resulting in undesirable fluctuations of armature current, motor torque and motor speed.

It is, accordingly, an object of my invention to provide a motor-control system of the variable-voltage type in which flat motor-speed regulation may be maintained by means independent of the motor-armature circuit.

Another object of my invention is to provide a motor-control system of the variable-voltage type in which the speed of the main motor shall be determined by the speed of an unloaded auxiliary motor having such relationship of fly-wheel effect and torque that its acceleration and deceleration characteristics approximate those desired of the main motor.

Other objects of my invention will become evident from the following detailed description, taken in conjunction with the accompanying drawing in which the single figure is a diagrammatic view of a system of control organized in accordance with the present invention.

Referring to the drawing, the apparatus shown therein comprises a separately excited main motor 1, the speed of which is to be controlled, having its armature connected in a local circuit with the armature of a separately-excited variable-voltage generator 2. The generator 2 is mechanically connected to any suitable driving means 3 which I have illustrated as an induction motor. The primary windings of induction motor 3 are to be connected to a suitable alternating-current source S1 by means of a switch 4.

The generator 2 is provided with a main field winding $2f$, a cumulative series winding $2s$ and a demagnetizing winding $2k$. The series winding $2s$ is preferably designed to compound the generator a sufficient amount to maintain the speed of motor 1 substantially constant, regardless of load. However, since other means are provided for correcting the speed regulation of motor 1, as will hereinafter more fully appear, the series winding $2s$ may be designed to have less effect than that necessary to maintain flat speed regulation of motor 1, or it may be omitted entirely. The demagnetizing winding $2k$ is to be connected, in a well known manner, in a suicide circuit with the armature of generator 2, by means of a relay 5. The main field winding $2f$ of generator 2 is connected, in series with contact members $5a$ of relay 5 and a field resistor $r1$, to a pair of conductors 6 and 7.

The conductor 6 is to be connected to a supply conductor L1 by means of a reversing switch 8 or to a supply conductor L2 by means of a reversing switch 9. The conductor 7 may be connected to supply conductor L2 by means of a reversing switch 10 or to supply conductor L1 by means of a reversing switch 11. The supply conductors L1 and L2 are to be connected to a suitable direct-current source S2 by means of a switch 12.

The armature of motor 1 and the armature of an auxiliary motor 14 are connected, in any suitable manner, to a differential device 13. For simplicity, I have shown one rotary member 13b of the differential device 13 mounted on the shaft of motor 1, and a second rotary member 13c mounted on the shaft of auxiliary motor 14. It will be understood, however, that any form of connection by which the rotary members of the differential device are driven at speeds proportional to the speeds of the main motor 1 and auxiliary motor 14 respectively may be used in practice. The crown member 13a of the differential device is utilized to close a variable number of contact members b, c, d, e, f, g and h, depending upon the relative angular displacement of the rotary elements of the differential device 13. While, for simplicity, I have illustrated the differential device 13 as a simple differential gear provided with a drum contactor, it will be understood that this device may assume any of a variety of forms familiar to those skilled in the art.

The armature 14a of auxiliary motor 14 is connected in parallel with a resistor r2 and in series with a resistor r3, the resistors r2 and r3 being connected in series to the conductors 6 and 7. The field winding 14f of auxiliary motor 14 is connected in parallel with the field winding 1f of motor 1, both field windings 14f and 1f being connected, in series with a field resistor r4, to the supply conductors L1 and L2.

The field resistor r4 is to be short circuited, under predetermined conditions, as will be hereinafter more fully explained, by means of a relay 15. The field resistor r1 is connected by adjustable taps, at intermediate points, to the series of contact members a, b, c, d, e, f, g and h.

A second-speed switch 16, a third-speed switch 17 and a high-speed switch 18 are provided for commutating the resistors r2 and r3, to thereby control the speed of auxiliary motor 14. The high-speed switch 18, in addition to commutating a section of resistor r3, also serves to partially open a circuit for the operating coil of relay 15, by means of its contact members 18a. The contact members of a voltage-responsive relay 29 are connected in parallel with the contact members 18a, the arrangement being such that the circuit for the operating coil of relay 15 is broken when the high-speed switch 18 is closed and the voltage of generator 2 exceeds a predetermined value. A second voltage-responsive relay 20 is provided for preventing the closure of high-speed switch 18 or the short circuiting of all of field resistor r1 unless the voltage of generator 2 exceeds a predetermined value.

The operating coil of relay 5 is connected in parallel with a circuit comprising a resistor r5 and contact members 17a of third-speed switch 17 and in series with the resistor r5.

The reversing switches 8 and 11 are provided with auxiliary contact members 8a and 11a connected to complete a discharge circuit for the field winding 2f when the reversing switches 8 and 11 are open and the relay 5 is closed.

A manual controller 19 is provided for completing the energizing circuit for either pair of reversing switches 8, 10 or 9, 11 and for thereafter successively completing energizing circuits for the second-speed switch 16, the third-speed switch 17 and the high-speed switch 18 in a well known manner.

The operation of the above-described apparatus may be set forth as follows: Preliminary to control of the motor 1 by means of the manual controller 19, the switches 4 and 12 are closed. Upon closure of switch 4, the induction motor 3 is connected to the alternating-current source S1 and accelerates, together with the generator 2, to running speed. Upon closure of switch 12, a circuit for the field windings 1f of motor 1 and 14f of auxiliary motor 14 is completed through the resistor r4. At the same time, a circuit for the operating coil of relay 15 is completed through the contact members 18a of high-speed switch 18 and the contact members of voltage-responsive relay 29 and relay 15 closes to short circuit the resistor r4. The excitation of motor 1 and that of auxiliary motor 14 now builds up to maximum value in the usual manner.

The motor 1 may now be put into operation by manipulation of the manual controller 19. If the handle of manual controller 19 is moved to the right to its first operating position, a circuit for the operating coils of reversing switches 8 and 10 is completed as follows: from supply conductor L2, through contact members 19a, 19b and 19c of manual controller 19, thence through the operating coils of reversing switches 10 and 8, to supply conductor L1, and reversing switches 8 and 10 close.

Reversing switch 8, in closing, connects the conductor 6 to supply conductor L1 and opens its contact members 8a, thereby breaking the discharge circuit for field winding 2f of generator 2. Reversing switch 10, in closing, connects the conductor 7 to the supply conductor L2. Because of the connection of conductors 6 and 7 to supply conductors L1 and L2, respectively, a circuit is completed through the operating coil of relay 5 and resistor r1. At the same time, a low voltage is impressed on the armature 14a of auxiliary motor 14 because of the potentiometer arrangement of resistors r2 and r3. The relay 5 closes, completing a circuit for the field winding 2f and disconnecting the demagnetizing winding 2k from the armature terminals of generator 2.

The auxiliary motor 14 now accelerates at a rate determined by the fly-wheel effect of its armature to a speed determined by the voltage impressed on its armature 14a. At the same time, the current in field winding 2f of generator 2 builds up at a rate determined by the time constant of the generator field circuit. It will be noted that, at this time, the entire resistor r1 is connected in series with the generator field winding 2f, and the resistor r5 is connected in parallel with it. The series resistor r1 tends to cause the field current to increase rapidly, whereas the parallel resistor r5 tends to prevent a rapid change of field current. Assuming proper adjustment of the resistor r5, the rate of increase of generator field current approximately corresponds to the rate of acceleration of pilot motor 14.

The voltage of generator 2 now builds up, causing the motor 1 to accelerate. If, because of a load on motor 1, the speed of the latter motor tends to fall below the speed of the auxiliary motor 14, the crown member 13a of the differential device rotates in a direction to short circuit several sections of resistor r1. The excitation of generator 2 now increases to cause an increase of speed of motor 1 until the speed and angular position of motor 1 correspond to the speed and angular position of auxiliary motor 14. If, on the other hand, the load on motor 1 is overhauling, so that the speed of motor 1 tends to exceed the speed of auxiliary motor 14, the crown member 13a rotates in the opposite direction, inserting the entire resistor r1 in series with the generator field winding 2f, thereby reducing the terminal voltage of generator 2 and the speed of motor 1 until the latter again corresponds to the speed of auxiliary motor 14. In this way, the crown member 13a oscillates back and forth slightly to maintain such average value of resistor r1 that the speed of motor 1 exactly corresponds to the speed of auxiliary motor 14. As the auxiliary motor 14 runs unloaded at all times, its rate of acceleration and its final speed are the same under all conditions of the main-motor circuit, thereby fixing the rate of acceleration and final speed of motor 1, regardless of the value or direction of load on the latter.

If the handle of manual controller 19 is moved farther to the right to its second operating position, a circuit for the operating coil of second-speed switch 16 is completed and the latter switch closes to remove a short circuit from a section of resistor r2 and to short circuit a section of resistor r3. The voltage applied to the armature of auxiliary motor 14 now increases to a second value, and the auxiliary motor 14 accelerates to a second speed. Meanwhile, the differential device 13 operates to maintain the speed of motor 1 at a value corresponding to the speed of auxiliary motor 14, in the manner previously described. In this way, the motor 1 is accelerated to second speed.

If the handle of manual controller 19 is moved farther to the right to its third operating position, a circuit for the operating coil of third-speed switch 17 is completed and the latter switch closes. Switch 17, in closing, short circuits a section of resistor r3, and, at the same time, disconnects resistor r5 by the opening of contact members 17a. The short circuiting of the section of resistor r3 increases the voltage applied to the armature of auxiliary motor 14, causing the latter motor to accelerate to a third-speed; the differential device 13 operating, as before, to maintain the speed of motor 1 at a value determined by the speed of pilot motor 14. The differential device 13 now operates to maintain the average value of resistor r1 at a comparatively low value corresponding to the high speed of motor 1. Because of the low value of resistor r1, the rate of change of field current in the generator-field winding 2f would now be too low to correspond to the rate of change of speed of the auxiliary motor 14, except for the fact that the shunt resistor r5 is now disconnected. The disconnection of the resistor r5 approximately compensates for the reduction of value of resistor r1 so that the time constant of the generator-field circuit returns to approximately the value it had when the manual controller 19 was in its first operating position.

As the motor 1 accelerates to its third-speed, the voltage of generator 2 rises to a value sufficient to cause operation of the voltage-responsive relay 20. The voltage-responsive relay 20 now closes to partially complete a circuit for the high-speed switch 18 and, at the same time, to connect the two maximum-speed taps of the resistor r1 to the contact members g and h of the differential device 13 respectively.

If the handle of manual controller 19 is now moved farther to the right to its last operating position, a circuit for the operating coil of the high-speed switch 18 is completed, and the latter switch closes. Switch 18, in closing, short circuits a section of resistor r3 and opens its contact members 18a in the circuit of the relay 15. The opening of contact members 18a has no immediate effect as the circuit of relay 15 is, at this time, completed through contact members of voltage-responsive relay 29.

The voltage impressed on the armature of auxiliary motor 14 now rises to its maximum value, and the auxiliary motor 14 accelerates to a higher speed. At the same time, the differential device 13 acts, in the manner previously explained, to cause the voltage of generator 2 and the speed of motor 1 to increase in approximate proportion to the increase of speed of auxiliary motor 14. As the voltage of generator 2 increases, it attains a value sufficient to cause operation of the voltage-responsive relay 29. Relay 29 now operates to open its contact members, thereby breaking the circuit of relay 15. Relay 15 drops out to insert the resistor r4 in series with the field windings 1f of motor 1 and 14f of auxiliary motor 14. Because of the parallel connection of field windings 1f and 14f, the current in these windings decreases proportionately, causing approximately the same percentage increase of speed of both motors. The motor 1 is now operating at full speed, its speed being maintained at a constant value, regardless of variations of load, by the action of the auxiliary motor 14 and the differential device 13.

When it is desired to stop the motor 1, the handle of manual controller 19 is centered. This operation successively breaks the circuits of high-speed switch 18, third-speed switch 17, second-speed switch 16 and reversing switches 8 and 10, thus causing these switches to drop out in the order named.

High-speed switch 18, in dropping out, inserts a section of resistor r3 in series with the armature of auxiliary motor 14, and completes a circuit for the relay 15. The relay 15 now closes to short circuit the resistor r4, thereby strengthening the fields of motor 1 and auxiliary motor 14 and causing the speed of both motors to decrease. The insertion of a section of resistor r3 causes a further decrease in the speed of auxiliary motor 14 and a reduction of the terminal voltage of generator 2. The voltage-responsive relay 29 now drops out.

Third-speed switch 17, in dropping out, inserts a section of resistor r3 in series with the armature of auxiliary motor 14 and connects the resistor r5 in parallel with the field winding 2f. The speed of the auxiliary motor 14 now falls to a lower value to cause a decrease of voltage of generator 2 and a decrease of speed of motor 1. The generator voltage being now insufficient to maintain the relay 20 energized, the latter relay drops out.

Second-speed switch 16, in dropping out, short circuits a section of resistor r2 and inserts a section of resistor r3 in series with the armature of pilot motor 14, thereby further reducing the speed of pilot motor 14 and that of motor 1.

Reversing switch 10, in dropping out, disconnects the conductor 7 from the supply conductor L2. Reversing switch 8, in dropping out, disconnects the conductor 6 from the supply conductor L1 and establishes a discharge circuit for the field winding 2f through the contact members 5a of relay 5, part of resistor r1 and contact members 8a and 11a of reversing switches 8 and 11, respectively. Since no external voltage is now applied to the armature of auxiliary motor 14 the latter is rapidly brought to rest by the dynamic-braking action of resistor r2. The field winding 2f, being now disconnected from the supply conductors L1 and L2, discharges, in three parallel paths, through the resistor r5, the winding of relay 5 and part of the field resistor r1. When the discharge current falls to a low value, the relay 5 drops out to break the circuit of the field winding 2f at contact members 5a and establishes a suicide connection of the demagnetizing winding 2k and the armature of generator 2. The demagnetizing winding 2k now acts, in well known manner, to destroy the residual magnetism of generator 2 and to thereby bring the armature of motor 1 to rest.

The manual controller 19 may now be moved to the right or to the left to initiate further operation of the motor 1 in either direction.

While my invention is primarily applicable to elevator systems, it will be understood that many devices not necessary for an understanding of my invention but which would be used in practice in an elevator system, such as limit switches, the motor and car brakes, door interlocks, levelling switches and holding circuits controlled thereby, car, cables, counterweights and other devices well known in the art have been omitted for simplicity.

I do not intend that the present invention shall be restricted to the specific structural details, arrangements of parts or circuit connections herein set forth, as various modifications thereof may be effected without departing from the spirit and scope of my invention. I desire, therefore, that only such limitations shall be imposed as are indicated in the appended claims.

I claim as my invention:

1. In a motor-control system, a main motor, a differential device having a first rotary member and a second rotary member, means for driving said first rotary member at a speed proportional to the speed of said main motor, an auxiliary motor for driving said second rotary member, means responsive to differential rotation of said rotary members for controlling the speed of said main motor to reduce said rotation, and means for simultaneously reducing the excitation of said main motor and of said auxiliary motor to increase the speed of said main motor.

2. In a motor-control system, a motor, a generator, electrical conductors connecting the armatures of said motor and said generator, a differential device having a first rotary member and a second rotary member, means for driving said first rotary member at a speed proportional to the speed of said motor, means for driving said second rotary member, means responsive to differential rotation of said rotary members for controlling the excitation of said generator to reduce said rotation, and means for simultaneously increasing the speed of said second rotary member and reducing the excitation of said motor to increase the speed of said motor.

3. In a motor-control system a main motor, a generator, electrical conductors connecting the armatures of said motor and said generator, a differential device having a first rotary member and a second rotary member, means for driving said first rotary member at a speed proportional to the speed of said main motor, an auxiliary motor for driving said second rotary member, means responsive to differential rotation of said rotary members for controlling the excitation of said generator to reduce said rotation, and means for simultaneously reducing the excitation of said main motor and of said auxiliary motor to increase the speed of said main motor.

4. In a motor-control system, a motor, a generator, electrical conductors connecting the armatures of said motor and said generator, a differential device having a first rotary member and a second rotary member, means for driving said first rotary member at a speed proportional to the speed of said motor, means for driving said second rotary member, means responsive to differential rotation of said rotary members for controlling the excitation of said generator to reduce said rotation, means for varying the speed of said second rotary member to thereby vary the speed of said motor over a predetermined range, and means for simultaneously increasing the speed of said second rotary member and reducing the excitation of said motor to cause said motor to operate at a speed above said predetermined range.

5. In a motor-control system, a main motor, a generator, electrical conductors connecting the armatures of said main motor and said generator, a differential device having a first rotary member and a second rotary member, means for driving said first rotary member at a speed proportional to the speed of said main motor, an auxiliary motor for driving said second rotary member, means responsive to differential rotation of said rotary members for controlling the excitation of said generator to reduce said rotation, means for varying the speed of said auxiliary motor to thereby vary the speed of said main motor over a predetermined range, and means for simultaneously reducing the excitation of said main motor and of said auxiliary motor to cause said main motor to operate at a speed beyond said range.

6. In a motor-control system, a first dynamo-electric machine, a second dynamo-electric machine, electrical conductors connecting the armatures of said dynamo-electric machines, a differential device having a first rotary member and a second rotary member, means for driving said first rotary member at a speed proportional to the speed of said first dynamo-electric machine, an auxiliary motor for driving said second rotary member, means responsive to differential rotation of said rotary members for controlling the excitation of one of said dynamo-electric machines to reduce said rotation, and means for simultaneously reducing the excitation of said first dynamo-electric machine and of said auxiliary motor to thereby increase the speed of said first dynamo-electric machine.

7. In a motor-control system, a main motor, a generator, electrical conductors connecting the armature of said main motor and said generator, a differential device having a first rotary member and a second rotary member, means for driving said first rotary member at a speed proportional to the speed of said main motor, an auxiliary motor for driving said second rotary member, means responsive to differential rotation of said rotary members for controlling the excitation of said generator to reduce said rotation, a direct-current source, potentiometer-resistance means connected to said source, means for connecting the armature of said auxiliary motor to variable portions of said resistance means to thereby vary the speed of said main motor within a predetermined range, and means for simultaneously reducing the excitation of said main motor and of said auxiliary motor to cause said main motor to operate at a speed beyond said predetermined range.

HENRY D. JAMES.